United States Patent

Klein

[15] 3,643,169
[45] Feb. 15, 1972

[54] WAVEFORM SENSING AND TRACKING SYSTEM

[72] Inventor: Albert M. Klein, Chatsworth, Calif.

[73] Assignee: International Telephone and Telegraph Corporation, New York, N.Y.

[22] Filed: Nov. 3, 1969

[21] Appl. No.: 873,382

[52] U.S. Cl..............................................328/150, 328/14
[51] Int. Cl..........................................................H03k 17/00
[58] Field of Search....................328/14, 135, 146, 115, 150, 328/151; 325/38.1; 307/231, 235

[56] References Cited

UNITED STATES PATENTS

| | | | |
|---|---|---|---|
| 2,996,581 | 8/1961 | Lord et al. | 328/14 |
| 3,116,458 | 12/1963 | Marcopoulos | 328/151 |
| 3,283,066 | 11/1966 | Sauvanet | 307/231 |
| 3,393,364 | 7/1968 | Fine | 325/38.1 |
| 3,423,683 | 1/1969 | Kelsey et al. | 328/151 |
| 3,473,131 | 10/1969 | Perkins, Jr. | 328/151 |
| 3,508,158 | 4/1970 | Marchese | 328/151 |

Primary Examiner—Donald D. Forrer
Assistant Examiner—R. E. Hart
Attorney—C. Cornell Remsen, Walter J. Baum, Paul W. Hemminger, Percy P. Lantzy and Thomas E. Kristofferson

[57] ABSTRACT

A waveform sensing tracking system for indicating and tracking the peaks occurring in a waveform. An analog-to-digital converter changes the incoming analog signal to a digital signal. Alternate digital signals are switched to different storage resistors. The alternately stored signals are then compared and an output signal produced when a peak in the signal occurs.

1 Claim, 8 Drawing Figures

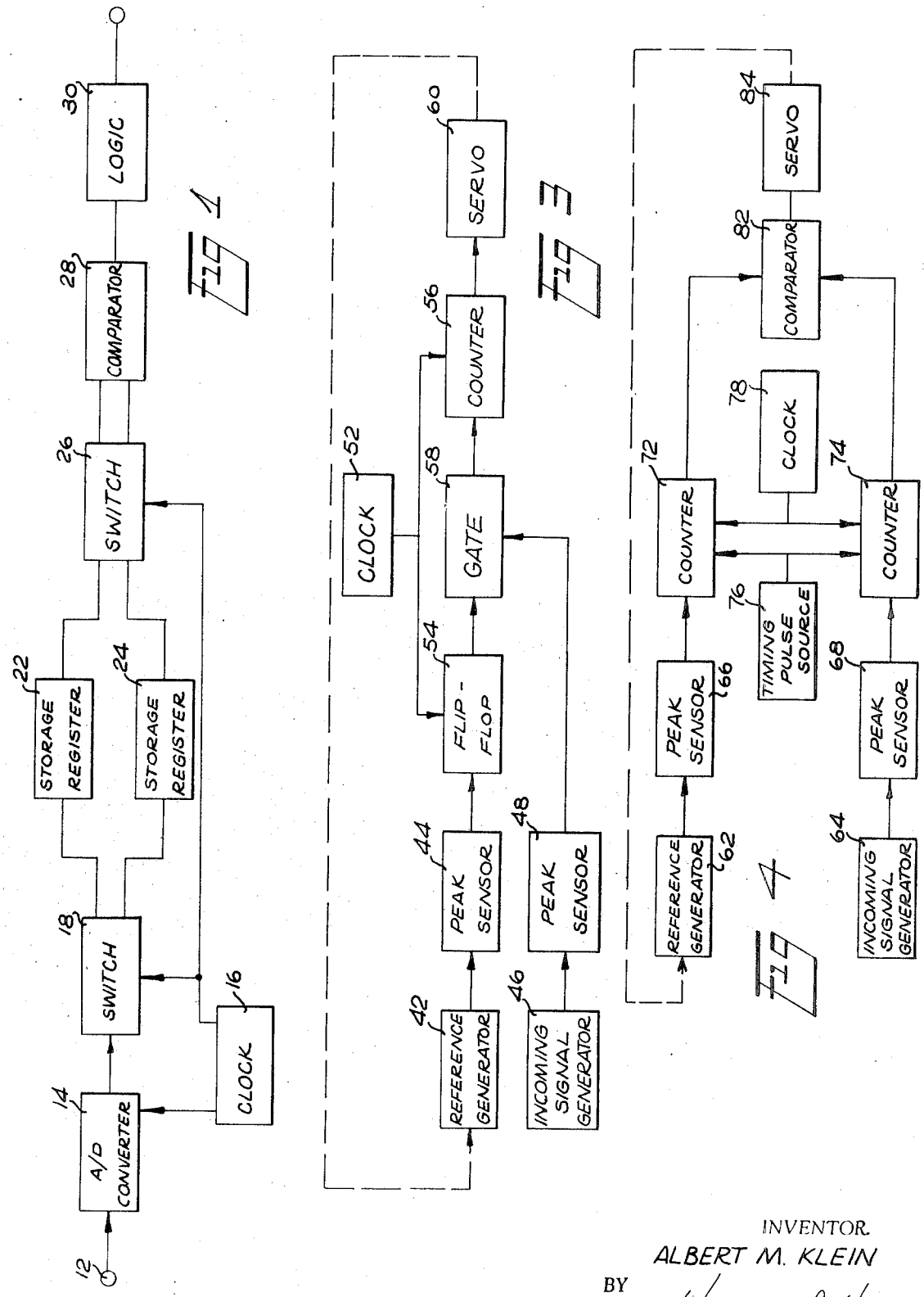

INVENTOR.
ALBERT M. KLEIN
BY
ATTORNEY

WAVEFORM SENSING AND TRACKING SYSTEM

The invention relates in general to waveform sensing and tracking systems, and more particularly, to a system for detecting, indicating and tracking the peaks occurring in a waveform.

BACKGROUND OF THE INVENTION

In many electrical applications, it is necessary to determine as accurately as possible, the time of occurrence and the amplitude of positive or negative peaks occuring in an input waveform. Normally, peak sensing systems have utilized analog signals to determine when the peak of a signal has occurred. By comparing a first amplitude value of the waveform to a second amplitude value thereof obtained and stored later in time, the comparison can indicate that the second value is greater than the first value and, thus, the input waveform is increasing in amplitude. Moreover, if the opposite is indicated, then the waveform is decreasing in amplitude. Normally, means are provided to indicate when these comparisons change. For example, in the first comparison, with the input waveform increasing in amplitude, the second value exceeds the first value. However, when the comparisons switch, and the second value is less than the first value, the system provides an indication that a peak has been achieved in the waveform. As long as the second amplitude value is less than the first, then, of course, the amplitude of the input waveform is decreasing. When, however, the comparison switches and the second amplitude becomes greater than the first amplitude, the switching indicates that a valley has been achieved in the input waveform.

In order to overcome the attendant disadvantages of prior art peak sensing systems, the present invention converts the incoming waveform, whose peak is to be sensed, into digital form. Each sample value is then compared with the prior sample value to determine when the peak of the waveform has occurred. The waveform is quantized into a selectable number of levels at a selectable sampling rate. The present invention lends itself to any conventional waveform tracking system such as radar, and permits precision determination of the occurrence of the waveform peaks and of their duration.

The advantages of this invention, both as to its construction and mode of operation, will be readily appreciated as the same become better understood by reference to the following detailed description when considered in connection with the accompanying drawings in which like referenced numerals designate like parts through the figures.

BRIEF DESCRIPTION OF THE DRAWINGS

FIG. 1 depicts, in block diagram, the peak detection system in accordance with the invention.

FIG. 3 illustrates, in block diagram, a waveform tracking unit which utilizes the peak detection system of FIG. 1 therein.

FIG. 4 shows another waveform tracking unit utilizing the peak detection system of FIG. 1.

DESCRIPTION OF THE PREFERRED EMBODIMENT

Figure 2A:
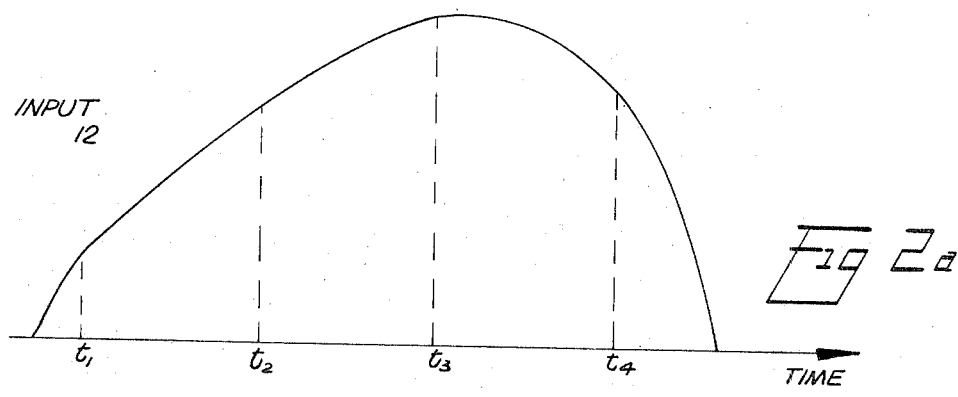
FIG. 2 (a-e) illustrates an example of waveforms employed in the apparatus of FIG. 1.

Referring now to the drawings, there is shown diagrammatically in FIG. 1, a preferred embodiment of a peak sensing system. An input waveform is applied to an input terminal 12 of the system. The input terminal 12 is connected to an input terminal of an analog-to-digital converter 14. A sampling clock 16 has an output connected to an input of the analog-to-digital converter 14. Output signals from the analog-to-digital converter are coupled in accordance with signals from the clock 16 to an input of a switch 18. An output of the clock 16 is also coupled to an input of the switch 18 so as to control the switching rate thereof. Output signals from the switch 18 are alternately coupled to a first storage register 22 and a second storage register 24. The output of both storage registers 22 and 24 are coupled to a switch 26. Further, signals from the clock 16 are also coupled to the switch 26. Output signals from the switch 26 are coupled to a comparator 28 which compares the output signals from the storage register 22 and 24. Output signals from the comparator 28 are coupled to a logic circuit 30 which produces an output pulse when a peak signal has been detected.

Figure 2B:
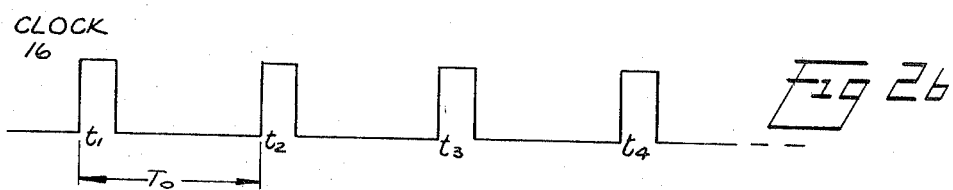
Figure 2C:
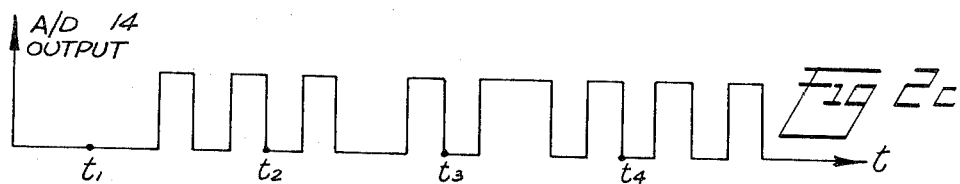
Figure 2D:
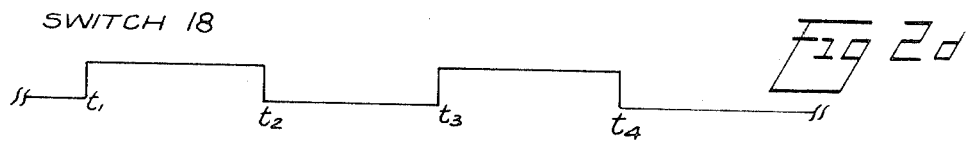
Figure 2E:
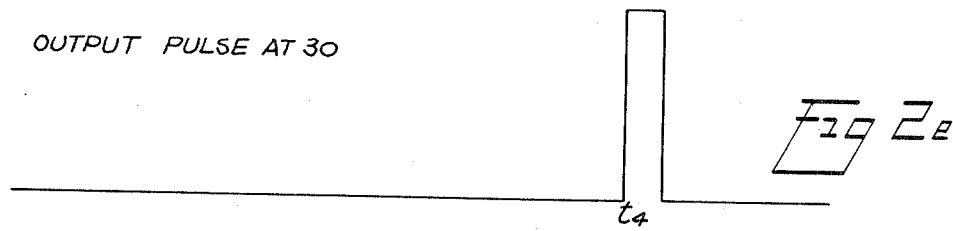

Operation of the system in FIG. 1 may be better understood by reference to the waveforms of FIG. 2 (a-e). The input analog waveform at the input terminal 12, as shown in FIG. 2 (a), is converted to digital bits at a rate determined by the clock pulses of FIG. 2 (b). Each clock pulse from the clock 16 causes the analog-to-digital converter 14 to produce a multiple bit output signal which is shown in FIG. 2 (c), as a five bit digital signal. The switch 18 produces an output signal shown in FIG. 2 (d) which couples alternate samples of digitized output signals into the registers 22 and 24, respectively, at a rate determined by the clock 16. One of the sampled signals from one of the storage registers together with a previous sample contained in the other register are then steered through the switch 26 once again at a rate determined by the clock 16, into the comparator circuit 28. Each time a current sample is determined to have a quantity greater than the previous sample, an output pulse from the logic circuit 30 shown in FIG. 2 (e) is produced. As can be readily seen, the storage registers 22 and 24 could be reconfigured, so that the entire waveform could be stored therein and reproduced by a command signal. Further, it should be understood that while the multiple bit output signal has been depicted as a five bit signal, it should be understood of course, that more or fewer bits could be used.

Referring now to FIG. 3, there is diagrammatically shown, a waveform tracking system utilizing the peak detection system of FIG. 1. A reference signal from a reference generator 42 is applied to the input of a first peak sensor 44 of the type shown in FIG. 1. Simultaneously, an incoming signal from a generator 46 is applied to a second peak sensor 48, also similar to the type shown in FIG. 1 and normally identical to the unit 44.

A clock 52, which could be the clock 16 of FIG. 1, is coupled to an input of a flip-flop circuit 54 and a counter 56. Output signals from the first sensor 44 are coupled to an input of the flip-flop 54 and output signals from the sensor 48 are coupled to a gate 58. Output signals from the flip-flop 54 are also coupled to the gate 58 and output signals from the gate 58 are coupled to the counter 56. The output of the counter 56 is coupled to a reference servo 60 and the output of the servo 60 is fed back to an input terminal of the reference generator 42.

The signals from the reference generator 42 are digitized and waveform peak output signals produced and fed to an input of the flip-flop 54; simultaneously, peak output signals from the system 48 of the incoming signals from generator 48 are fed to the gate 58. The clock 52 is continuously resetting the counter 56 and flip-flop 54. If the reference signal peak occurs first after the counter reset, a one-count is recorded and the flip-flop 54 is set to enable the gate 58. This condition permits lagging incoming pulses to record a two-count. The count is sampled and the reference servo 60 drives the reference waveform toward the coincidence with the incoming waveform. A lagging reference only records a one-count because the incoming signal cannot record a count through the now disabled gate.

Referring now to FIG. 4, there is shown an alternative embodiment of the waveform tracking unit. Reference signals from a generator 62 and incoming signals from a source 64 are coupled to a first and second peak sensor unit 66 and 68, respectively, of the type shown in FIG. 1. Output signals from the peak sensors 66 and 68 are coupled to a first counter 72 and a second counter 74, respectively. A timing pulse source 76 which starts the count of the counters, and a clock 78 are coupled to the counters 72 and 78. Each of the counters measures the time at which the peaks occurred and then stops counting. The difference between the two counts, is, of course, the time difference between the two peaks. The two counters are coupled to a comparator 82 which notes the difference between the two counts and produces an output signal in sense and magnitude of this difference. The output may then be fed to a reference servo 84, the output of the reference servo being coupled to an input of the reference generator 62 so as to correct the reference generator, so that its waveform peak is time coincident with the waveform peak of the incoming signal source.

The instrumentation shown in FIG. 4 may, of course, be applied to open loop systems to simply give a precise measurement of the waveform time delay between selected points of the two waveforms.

It should be further noted that the peak detection system of FIG. 1 could rather readily be modified with additional logic and storage so that one could determine rise time; intermediate amplitude points; peak durations, and other information regarding the waveform to a high level of precision. The peak detection system of the present invention lends itself to any waveform tracking system such as radar, and could be used to develop the statistical inference with which to determine digital clock synchronization.

Further, it should be understood that the term "peaks" refers to positive peaks, as well as negative peaks, of the incoming analog signal, although the term "valley" is sometimes used to refer to negative peaks.

I claim:

1. A waveform sensing and tracking system for indicating the peak of an incoming analog signal comprising:

an analog to digital converter for converting said incoming analog signal to a digital signal, said incoming analog signal being quantitized into a digital signal of a predetermined number of bits, each of said digital signals representing the amplitude of said analog signal at a predetermined time interval;

means for switching alternate digital signals to a first and second storage register, respectively;

means for comparing said alternately switched digital signals, said alternately switched signals being steered through switching means to said comparing means;

means for producing an output signal when the value of a subsequent signal differs from the value of the previous signal;

clock means for controlling both the rate of converting said analog signals into digital signals, and switching said digital signals to said first and second storage registers; and a reference signal generator and means for comparing said output signal with a second output signal indicating the peak of said reference signal generator, and servo means operated in response to said output signals for driving said reference signal generator toward coincidence with the input analog signal.

* * * * *